(12) United States Patent
Sahuguet et al.

(10) Patent No.: US 9,257,056 B2
(45) Date of Patent: Feb. 9, 2016

(54) PROACTIVE USER-BASED CONTENT CORRECTION AND ENRICHMENT FOR GEO DATA

(75) Inventors: Arnaud Sahuguet, New York, NY (US); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 958 days.

(21) Appl. No.: 13/286,144

(22) Filed: Oct. 31, 2011

(65) Prior Publication Data

US 2013/0110847 A1 May 2, 2013

(51) Int. Cl.
| | |
|---|---|
| *G06F 17/30* | (2006.01) |
| *G09B 29/00* | (2006.01) |
| *G01C 21/32* | (2006.01) |
| *G06Q 10/10* | (2012.01) |
| *G09B 7/02* | (2006.01) |

(52) U.S. Cl.
CPC .............. *G09B 29/006* (2013.01); *G01C 21/32* (2013.01); *G06F 17/30648* (2013.01); *G06Q 10/101* (2013.01); *G09B 7/02* (2013.01)

(58) Field of Classification Search
CPC ..................... G06F 17/30648; G06F 17/30241
See application file for complete search history.

(56) References Cited

U.S. PATENT DOCUMENTS

| | | | |
|---|---|---|---|
| 6,853,905 B2 | 2/2005 | Barton | |
| 7,822,631 B1 | 10/2010 | Vander May et al. | |
| 8,015,183 B2 | 9/2011 | Frank | |
| 8,412,709 B1 * | 4/2013 | Belwadi et al. | 707/736 |
| 2005/0027590 A9 * | 2/2005 | Gailey et al. | 705/14 |
| 2007/0072585 A1 | 3/2007 | Johnson et al. | |
| 2007/0121596 A1 | 5/2007 | Kurapato et al. | |
| 2008/0059453 A1 * | 3/2008 | Laderman | 707/5 |
| 2008/0208849 A1 | 8/2008 | Conwell | |
| 2009/0024589 A1 | 1/2009 | Sood et al. | |
| 2009/0043786 A1 | 2/2009 | Schmidt et al. | |
| 2009/0182780 A1 | 7/2009 | Wong et al. | |
| 2009/0187442 A1 * | 7/2009 | Kohanim et al. | 705/7 |
| 2010/0070930 A1 | 3/2010 | Thibault | |
| 2010/0082617 A1 * | 4/2010 | Liu et al. | 707/729 |
| 2010/0153451 A1 | 6/2010 | Delia et al. | |
| 2010/0191798 A1 * | 7/2010 | Seefeld et al. | 709/203 |
| 2011/0072034 A1 | 3/2011 | Sly et al. | |
| 2012/0110006 A9 | 5/2012 | Lubarski et al. | |
| 2012/0173992 A1 * | 7/2012 | D'Angelo et al. | 715/751 |
| 2012/0232953 A1 * | 9/2012 | Custer | 705/7.32 |
| 2013/0125211 A1 | 5/2013 | Cashman et al. | |

FOREIGN PATENT DOCUMENTS

| | | |
|---|---|---|
| JP | 2007-147567 | 6/2007 |
| JP | 2010-502939 | 1/2010 |

(Continued)

OTHER PUBLICATIONS

PCT International Search Report and Written Opinion, PCT/US2012/059837, Dec. 17, 2012, 11 pages.
Search Report and Written Opinion for Dutch Patent Application No. 2009641, Dec. 13, 2012, 9 Pages.

(Continued)

*Primary Examiner* — Mohammad S Rostami
(74) *Attorney, Agent, or Firm* — Fenwick & West LLP

(57) ABSTRACT

A system and method determines ambiguous or missing information about map features, generates questions to address the ambiguity or the missing information and determines users from whom to request feedback to clarify the ambiguity or supply the missing information.

16 Claims, 6 Drawing Sheets

(56) References Cited

FOREIGN PATENT DOCUMENTS

| | | |
|---|---|---|
| JP | 2010-164688 | 7/2010 |
| JP | 2010-211178 | 9/2010 |
| JP | 2010-231560 | 10/2010 |
| WO | WO 2011/0127659 A1 | 10/2011 |

OTHER PUBLICATIONS

Notice of Allowance for corresponding Japanese Patent Application No. JP 2014-538829, Nov. 16, 2015, 4 Pages. (With Concise Explanation of Relevance).

* cited by examiner

FIG. 5

PROACTIVE USER-BASED CONTENT CORRECTION AND ENRICHMENT FOR GEO DATA

BACKGROUND OF THE INVENTION

1. Field of the Invention

The disclosure is related to mechanisms for soliciting online feedback from users of an online hosted map system for updating and correcting information about map features.

2. Description of the Background Art

Maps frequently include incorrect information and the current approaches to correcting that information are laborious and expensive. On-line maps include much more information than their old paper counterparts. For example, with an online map, users can access phone numbers, opening times, etc., of businesses, such as stores, lodgings, restaurants, and the like. With more items of information on a map, however, there are more possibilities for errors on the map. Correcting errors in map data can include physically going to business locations, doing research on-line or calling the business, depending on the type of information that needs to be verified. This is laborious and expensive.

There are some online map hosting systems that allow individual end users to make suggestions for corrections to the systems' maps. These systems require that a correction proposed by an end user be reviewed and approved by an expert reviewer. In some such approaches, only after a user has built up credibility by having a large number of suggestions approved, are the user's proposed changes accepted without review. This approach is therefore still labor intensive and expensive, requiring a large number of expert reviewers to approve users' suggested changes.

Because of the prevalence of interactive mapping systems that provide users with details about map features beyond an address, users depend on this additional information and expect it to be correct. Inaccuracies in maps are therefore more noticeable and burdensome now than in the past.

Errors from incorrect and outdated data about map features lead to very frustrating user experiences. For example, a user may plan to visit a particular business on Sunday afternoon, based entirely on information from an on-line mapping system indicating that the business is open that day. If the business is in fact closed when the user arrives, the user has wasted significant time and energy on the trip.

SUMMARY OF THE INVENTION

Systems, methods and other embodiments afford updating map features on online maps by determining which information about a map feature requires confirmation or clarification, preparing questions to users in order to obtain the required confirmation or clarification, and targeting users for querying based on an analysis of the user's reliability in providing information for a given region and for a given category of map feature.

In one embodiment, a system accesses map features, each of which is associated with a region and a category, which are to be presented to a user in a map. The system determines whether there are questions saved for any of those map features. The system retrieves reliability scores from a user profile for the user, each score associated with a region or category of map feature. To determine which question or questions to present to the user, the system ranks the user's reliability scores and chooses the question whose feature's region and category match the region and category of the highest ranking reliability score(s) of the user. The system receives the user's response to the question and stores this response. Subsequently, responses from multiple users are analyzed to determine the proper information for updating or confirming the map feature.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 is a screenshot illustrating input being requested from a user for a map feature in a business listing interface according to one embodiment.

DETAILED DESCRIPTION OF THE DRAWINGS

System Overview

Figure 1:
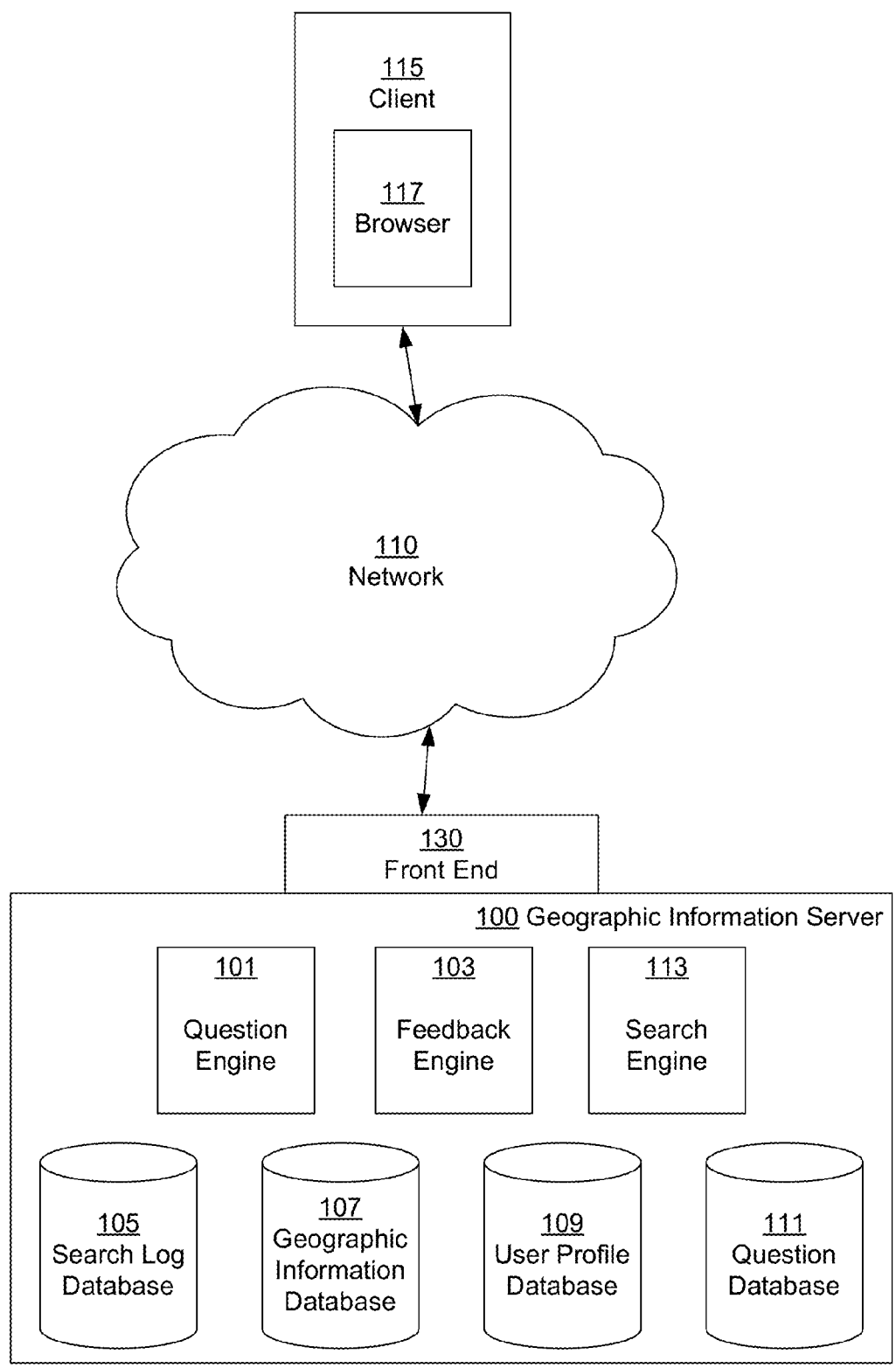
FIG. 1 is a diagram of system environment according to one embodiment.

FIG. 1 is a diagram of system environment according to one embodiment. The geographic information server 100 comprises a question engine 101, a feedback engine 103, a search log database 105, a geographic information database 107, a user profile database 109, a question database 111 and a search engine 113. For simplicity, only one question engine 101, one feedback engine 103, one search log database 105, one geographic information database 107, one user profile database 109, one question database 111 and one search engine 113 are shown, but in practice many of each of these may be in operation.

The geographic information server 100 communicates with a client 115 via its front end 130 and the network 110. The network 110 is typically the Internet, but may also be any network, including but not limited to a LAN, a MAN, a WAN, a mobile, wired or wireless network, telecommunication network, a private network, or a virtual private network, and any combination thereof.

The client 115 is any type of device that is adapted to access the geographic information server 100 over the network 110. Examples of clients include, but are not limited to, desktop computers as well as mobile devices such as a handheld computer, laptop computer, tablet computer, mobile phone or personal digital assistant (PDA) and devices that receive map information and wireless location system information such as navigation devices, which have been adapted to provide the structures and functions described herein. Most basically, a client 115 is configured to display information about map features, receive information from the user about a map feature and transmit the information to the geographic information server 100.

Different types of clients 115 have different advantages with the disclosed methods. Users using mobile devices may be at or on their way to locations about which they are searching. Those users are better able to verify certain types of information such as street address and opening hours. Users using less portable clients 115 likely have larger screens and have more room upon which to display questions.

The client 115 further comprises a client application for displaying information about map features and receiving the user input information about a map feature. In one embodiment the client application is a browser 117. The browser 117 is any browser known in the art. For simplicity only one client 115 is shown. In practice, very large numbers (e.g., millions) of clients 115, or as many as can be supported by the hardware and software implementation, can be in communication with the geographic information server 100 at any time.

The geographic information server 100 is implemented as server program executing on one or more server-class computers, each comprising a CPU, memory, network interface, peripheral interfaces, and other well known components. The computers themselves preferably run an open-source operating system such as LINUX, have generally high performance CPUs, with 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media), or by equivalent implementations in hardware and/or firmware.

The question engine 101 determines whether input is needed to fill in missing information or clarify ambiguous or contradictory information about a map feature and determines questions that can be provided to a user to obtain the desired information. The operation of one embodiment of the question engine 101 is described in greater detail in reference to FIG. 2.

The feedback engine 103 selects one or more questions to be displayed to a user as part of the result set returned in response to a search for map features. The feedback engine 103 also receives responses from users, processes the responses and updates the geographic information database 107 based on the responses. The operation of one embodiment of the feedback engine 103 is described in greater detail in reference to FIG. 3.

The search log database 105 stores searches requested by users of an on-line mapping system. This information is used by the question engine 101 to determine the priority of a question.

The geographic information database 107 stores map features and their attributes. A map feature is an entity that is associated with a geographic location (either a point or a region); the entity may be associated with the geographic location by being located there, either currently or at some point in the past. Examples of entities include, but are not limited to, points of interest (POI), bodies of water, mountains, forests, cities, addresses, streets, businesses, buildings, neighborhoods, historic sites, historic events (e.g., the location of Custer's Last Stand, or Woodstock) and landmarks.

Attributes of map features are characteristics of the map feature that identify, locate, or describe the entity; different types of map feature can have different sets of attributes. Attributes include, for example, the latitude and longitude of the map feature, the name of the map feature, the category of the map feature, a unique identifier for the map feature and the popularity of the map feature among users of the geographic information server 100. The map feature category describes what it is generically—a restaurant, hotel, park, landmark, etc. The popularity of the map feature is the number of times it is displayed to users in response to a search, i.e., the number of impressions. Alternatively, the popularity is a measure of or incorporates the number of times a user clicks through to a description of the map feature. Additional attributes are appropriate depending on the category of map feature. Street address is an attribute of many categories of map features. Attributes of map features that are businesses include phone numbers, fax numbers, website address, email address, whether credit cards are accepted and opening times. Attributes of restaurants also include attire, price and whether reservations are accepted. Generally, attributes are any pieces of information about a map feature that are useful to users of maps, and can describe the physical, contextual, or semantic aspects of a map feature.

The value for each attribute also has characteristics. Value characteristics include the source of the value and confidence in the value. The source of the value, e.g., a business listing website, may be the phone company, and may be provided by someone associated with the map feature or provided by a user. In one embodiment, the confidence in the value may take on one of four values—low, medium, high, missing or locked. Missing indicates that there is no value for the attribute. Locked indicates that the value cannot be changed. Values are locked when they are identified in a white list. Alternatively, the confidence in an attribute value may be a numeric score. The confidence can be based on the source of the value. Certain business listing websites may be known for high quality information and thus values obtained from such websites are assigned high confidence scores. Confidence scores can be determined by manually checking the accuracy of a value for the attribute, the history or reputation of the source for the value or voting by users on the accuracy of the value.

Each attribute also has a priority. The priority is a score of how important that particular attribute of the map feature is. This is used to prioritize attributes for soliciting feedback. In one embodiment, priority is determined based upon an analysis of search logs containing information about previously received search queries and their associated search results. Map features are returned in response to search queries and users click through individual attributes of the map features. For example, clicking through an address to a map of that address would add to the priority for the address attribute of a map feature. Clicking on the phone number of a map feature to place a call would add to the priority for the phone number attribute of the map feature. Clicking through a telephone number occurs for example, when a user is searching using a client device 115 that is a mobile telephone. Selecting the telephone number causes the mobile telephone to place a call to that telephone number. Alternatively, if a client device 115 is a desktop or laptop computer equipped with internet telephony, clicking through a telephone number results in the telephony software dialing the phone number.

An example of a schema storing attributes of a map feature is shown below. Each map feature, Map Feature 1 and Map Feature 2 have attributes. For each attribute, the value, priority, source and confidence are displayed. Both map features have a docid which is a unique identifier for the map feature; an impression count which is how many times the feature has appeared on maps or in business listings shown to users; a type which is the type of business (restaurant for Map Feature 1 and hotel for Map Feature 2); a location which is the latitude and longitude of the map feature and phone number. The location of the map feature may be approximate. Each map feature also has attributes specific to the type of map feature. Map Feature 1 is a restaurant and has attributes for opening hours (which is currently missing in the example and thus would be a candidate for a question to a user); whether they accept other than cash, whether it is wheel chair accessible, whether reservations are required and what the attire is. The hotel, Map Feature 2, has additional attributes of the number of stars it's received and its price range.

TABLE 1

| Map Feature | Value | Priority | Source | Confidence |
|---|---|---|---|---|
| ☐ Map Feature 1 | | | | |
| ☐ docid | AE1234FECB4 | | | |
| ☐ impression count | 2500 | | | |
| ☐ type | restaurant | | | |
| ☐ name | Vento | 100 | LBC | locked |
| ☐ location | z12345 | | | |
| ☐ opening hours | | 60 | | missing |
| ☐ phone number | 212 555 2130 | 100 | LBC | high |
| ☐ cash-only | NO | 20 | LBC | high |
| ☐ wheel-chair | YES | 10 | Zagat | low |
| ☐ reservation | YES | 10 | OpenTable | high |
| ☐ attire | casual dressy | 10 | Zagat | low |
| ☐ Map Feature 2 | | | | |
| ☐ docid | 123DFEAC45B | | | |
| ☐ impression count | 26300 | | | |
| ☐ type | hotel | | | |
| ☐ name | Hotel New York | 100 | IUSA | locked |
| ☐ location | z12365 | | | |
| ☐ phone number | 212 555 4109 | 100 | IUSA | locked |
| ☐ star | 4 star | 80 | IUSA | high |
| ☐ price range | 2/5 | 50 | Wikipedia | medium |

The user profile database 109 stores profiles for users of the geographic information server 100. A user profile includes an identifier for the user along with preferences entered by the user regarding whether or not the user is willing to participate in the system by providing information for map feature attributes and if so, how often, for what types of searches and/or map features, geographic regions about which the user has expertise and categories of map features about which the user has expertise. The user profile further includes a score of the user's reliability in responses to questions. This score is determined by the feedback engine 103.

The question database 111 stores the questions generated by the question engine 101 and is accessed by the feedback engine 103 when questions are needed to present to users.

Process Overview—Question Generation

Figure 2:
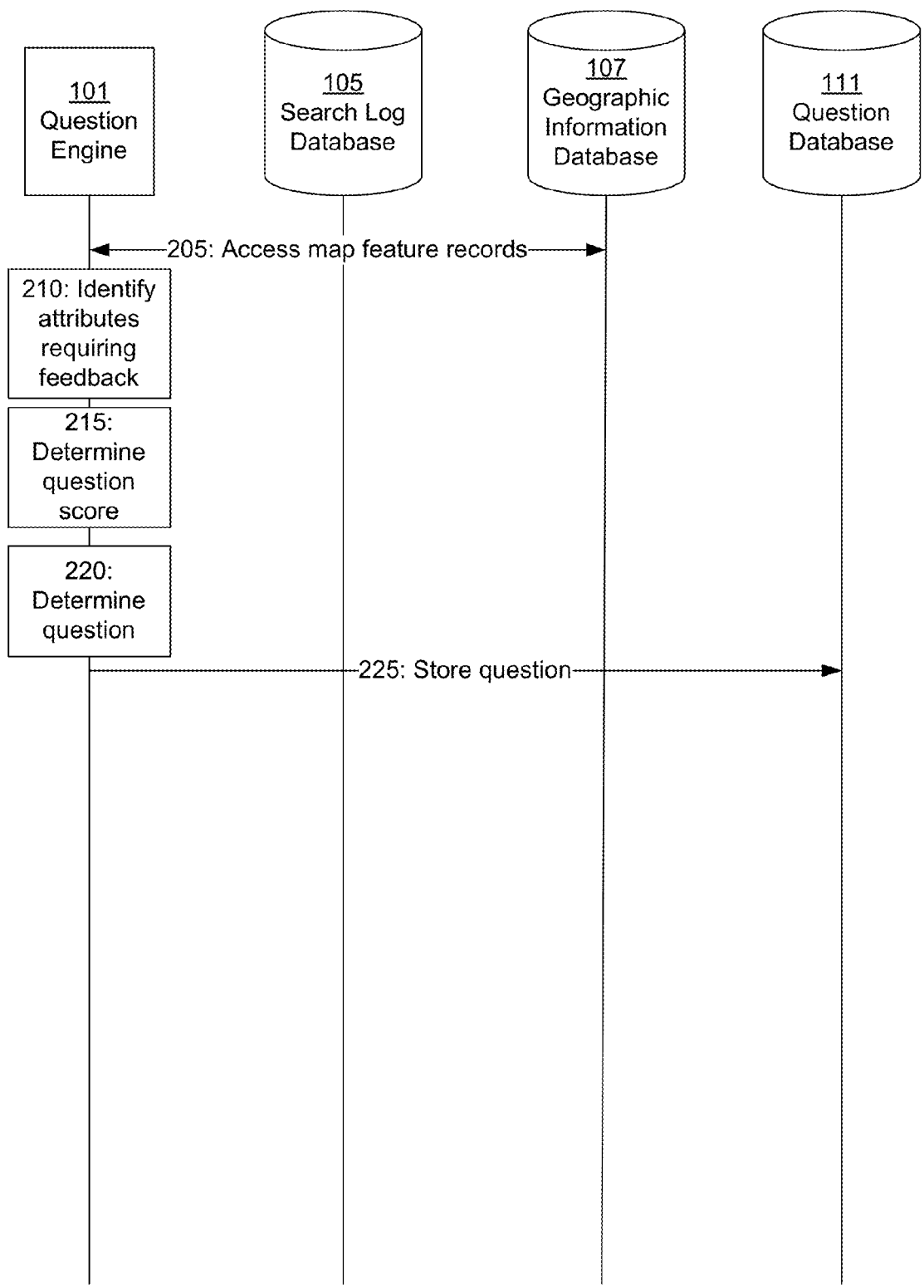
FIG. 2 is a data flow chart illustrating identifying attributes for which to request input according to one embodiment.

FIG. 2 is a data flow chart illustrating identifying attributes of map features that need input. The question engine 101 accesses 205 a subset of map feature records from the geographic information database 107 for processing. For this subset of map feature records, the question engine 101 identifies 210 those map feature attributes whose values have medium or low confidence or are missing as candidate attributes for possible question creation. The attribute value confidence and attribute priority are combined with the map feature's popularity to determine 220 a question score for the attribute value. The question score takes into account not only how popular the map feature is but how important the attribute is and how confident the system is in the attribute's current value. Thus, the system prioritizes questions seeking information on poorly known but important attributes for popular map features. In one embodiment, the question score, is:

question score=A log(feature popularity)+B log((attribute priority)×(1−attribute value confidence)) wherein A and B are constants which are determined, for example, through machine learning.

The question score is used to rank the set of candidate map feature attributes, and to select a subset of the candidate map feature attributes based on the rank. In this way, high priority attributes for popular map features whose values have low confidence are ranked first for soliciting feedback, while low priority attributes for map features (whether popular or not) whose values have high confidence are ranked low for soliciting feedback. The selected subset of candidate map feature attributes contains the candidate map feature attributes whose question scores exceed a threshold. For each selected candidate map feature attribute, the question engine 101 generates 220 a question to be used when soliciting feedback for the value of that attribute.

Types of questions include open-ended questions, true/false questions and multiple choice questions. The type of question generated depends upon the type of attribute being verified, and the current number of values known for that attribute. If there are multiple known values for an attribute, such as multiple phone numbers, the question created might be a multiple choice question using some (or all) of the known phone number values as choices. For example, the question can be: "Is the phone number for this restaurant: a) 123-456-7890; b) 456-258-7894; or c) 123-456-7880?"

If only one value is stored for an attribute but the confidence is low, the question can ask whether the value is correct. For example, the question can be: "Is the phone number for this restaurant 123-456-7890?"

If no value is stored for the phone number attribute, an open ended question may be created to obtain the value, such as, "What is the phone number for this restaurant?"

The questions generated by the question engine 101 are stored 225 in the question database. The map feature whose attribute the question is about is also stored. Usually the map feature is identified by a docid, which is itself an attribute of the map feature. Optionally, the question score for the map feature attribute that led to the generation of the question is saved with the question. This processing of map features and map feature attributes to determine questions to provide more information about those attributes can be done off-line on a periodic basis, such as once a day or once a week.

Process Overview—Obtaining Feedback

The process of obtaining feedback to the questions occurs in the context of a user accessing the map from a client device 115, for example by submitting a query to the search engine 113 for map related information. In one embodiment, the user's client device 115 is a mobile phone.

A user sends 301 a search query from the client device 115 to the search engine 113. The query can be explicit, such as a search request that includes the name of a city, business, geographical feature or the like, or the query can be implicit, such as a request for a map based on the user's current location. Many mobile client devices 115 have GPS capability and thus can pinpoint the device's location with a great deal of accuracy. Regardless of the particulars of the type of query, the search engine determines 303 the map features that are responsive to the search query. Map features responsive to the query include those that are within a region of the map to be displayed based on the query. The search engine 113 requests 305 questions for those map features from the feedback engine 103. The request from the search engine 113 includes identifiers of the map features that will be returned to the user as well as an identifier associated with the user requesting the search.

Figure 3:
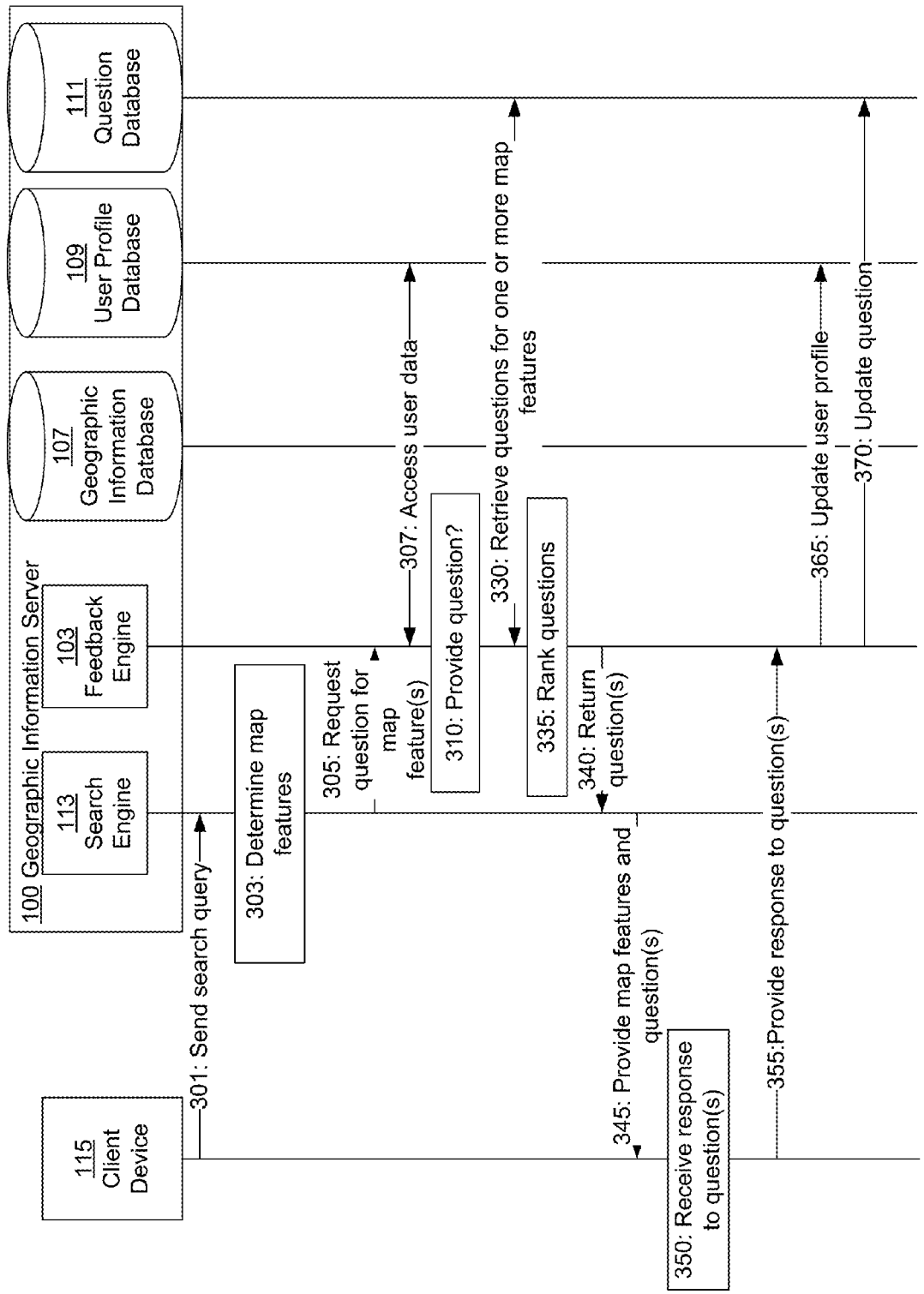
FIG. 3 is a data flow chart illustrating the method presenting a request for input to a user according to one embodiment.

While not shown in FIG. 3, the feedback engine 103 first determines whether there are any questions in the question database 111 that are associated with attributes of map features that are responsive to the user query. If no such questions exist in the question database 111 (e.g., because all attributes of the responsive map features have known values with high confidence), the feedback engine returns a null response to the search engine 113, and the search engine 113 provides the map features to the client device 115 with no feedback questions.

If, however, the feedback engine identifies one or more questions in the question database 111 that are associated with a map feature that is response to the received query, the feedback engine 103 accesses 307 user data for the user to whom the map features will be displayed from the user profile database 109. The feedback engine uses the accessed user data to determine whether or not to provide 310 a question to the user. The user data indicates whether the user is willing to provide feedback or not, and if so, it includes criteria for determining which questions to provide to the user. If the user data indicates that the user does not wish to provide feedback, no question will be provided to the search engine 113 to return to the user. In one embodiment, if a user has not affirmatively opted in to providing feedback, that user will not be provided questions about the map features responsive to the user's query. Alternatively, in another embodiment, only users who actively opt out will be excluded from being provided questions.

If the user data indicates that the user is willing to provide feedback (e.g., by opting in or, alternatively, by not opting out), the feedback engine 103 determines whether any of the map features to be displayed match the criteria for features about which the user is willing to provide feedback. Such criteria can include, for example, categories of map features, locations, types of attributes, and level of user interaction with the map feature. For example, the user may have indicated a willingness to provide feedback on only certain categories of map features, such as restaurants or book stores. Or, the user may have indicated a willingness to provide feedback only in certain regions, such as New York City or Boston. Or, a user may have indicated a willingness to provide feedback only for those map features for which the user has previously clicked through to a full page description of the map feature. Provided that a user is willing to provide feedback (as indicated by either specifically opting in or alternatively failing to opt out) and at least one of the map features to be displayed matches map features for which the user is willing to provide feedback, the feedback engine 103 proceeds to selecting a question to be displayed to the user.

The feedback engine 103 retrieves 330 questions stored in the question database 111 that are related to any of the attributes of the map features that will be displayed to the user and that match the user's feedback criteria.

The user data includes reliability scores that measure the reliability of feedback previously provided by that user. In one embodiment, the reliability score is measured as the percentage of the user's feedback subsequently determined to be correct with respect to a consensus answer based upon answers provided by other users. The reliability scores decay exponentially over time to ensure that more recent user data and feedback weighs more heavily in the user's reliability scores. How the consensus answer is determined from among the answers provided by other users is described further below.

The user can have a global reliability score based on all the feedback the user has provided, as well as reliability scores that are specific to certain categories of map features and geographic regions. In one embodiment, the reliability scores are specific to map features in a given geographic region. Such scores reflect the fact that while a user may be very reliable about restaurants in the area where the user lives, the user may be unable to provide reliable feedback about restaurants anywhere else.

User reliability scores can be keyed to map feature category and geographic region and expressed as <category, region, reliability score>. The questions retrieved from the question database 111 at step 330 are then ranked 335 according to the user's reliability score for the map feature category and geographic region associated with the retrieved question. The highest ranking one or more questions (depending on how many are to be provided) are returned 340 to the search engine 113. In one embodiment the question score for the question is also taken into account to determine the ranking of the questions. For example, if several questions have the same reliability score, the question score is used to determine the top question or questions. Alternatively, the question score and reliability score for each question are always combined to determine how to rank the returned questions. Questions for map feature attributes related to a map feature category and geographical region for which the user has a reliability score below a threshold can optionally be discarded. In one embodiment, if none of the user's reliability scores exceed a threshold, no questions are returned to the user even if the user has indicated that he or she is willing to answer questions and there are map features for which questions are stored. This is useful to avoid receiving data that is unlikely to be reliable— either from those users who are frequently incorrect or for users who are not familiar with a given geographic region or type of map feature.

The feedback engine 103 determines the number of questions to return based on a set of factors including user preferences, the size of the display on which the map features are to be displayed to the user and the placement of the map features on the display to the user. Fewer questions will be displayed to a user using a mobile device as that display is smaller and becomes cluttered more quickly. In one embodiment, only one question is displayed to a user on a mobile device. Even on larger displays, it is counterproductive to clutter the display with map feature questions. Thus, if highest ranking questions exist for map features, and those questions will be displayed in close proximity either on a map or in a list the question which is ranked the highest (e.g., based on user reliability score, question score, or both) is displayed and the others are not displayed.

Figure 4:
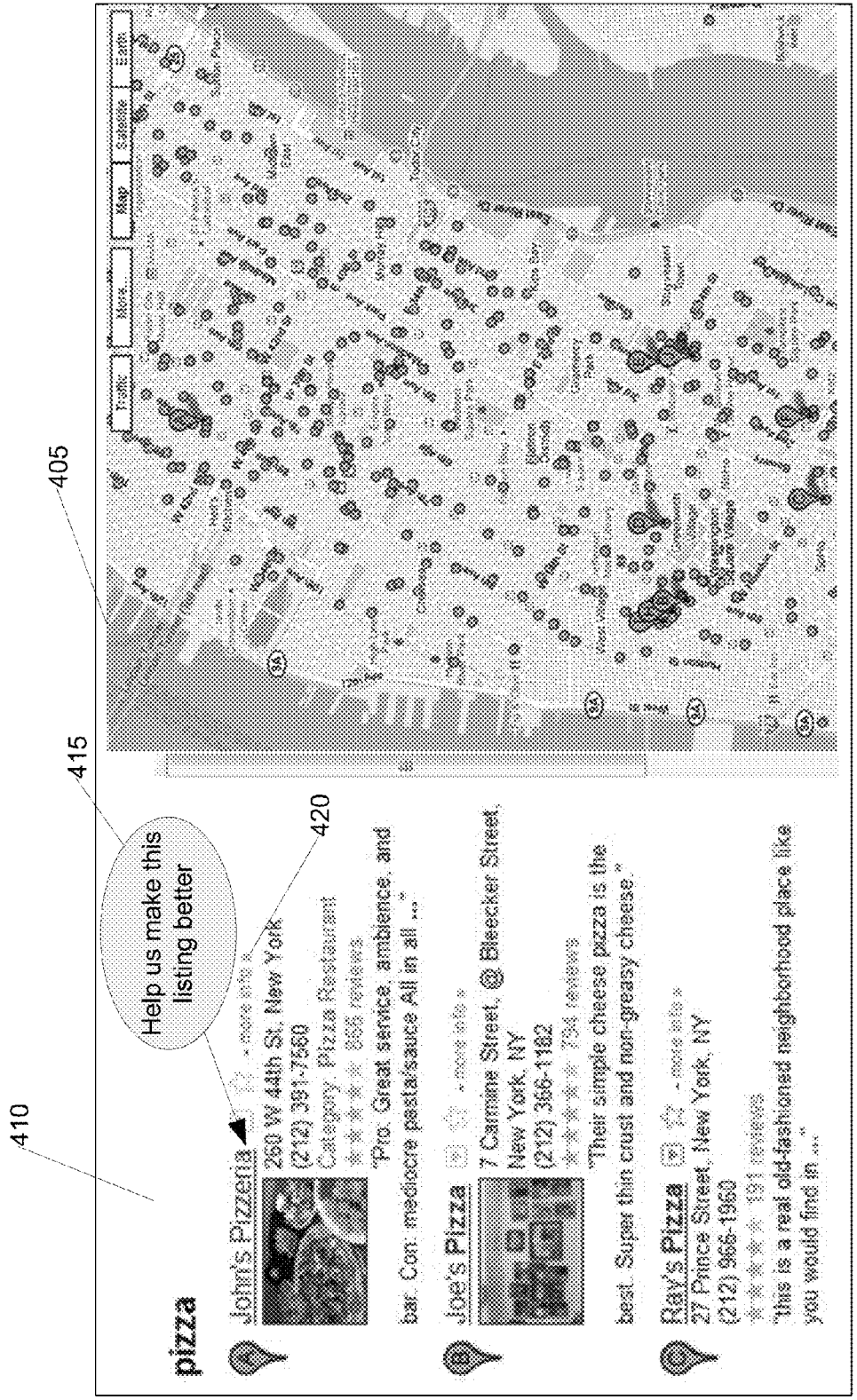
FIG. 4 is a screenshot illustrating input being requested from a user for a map feature in a map interface according to one embodiment.
Figure 5:
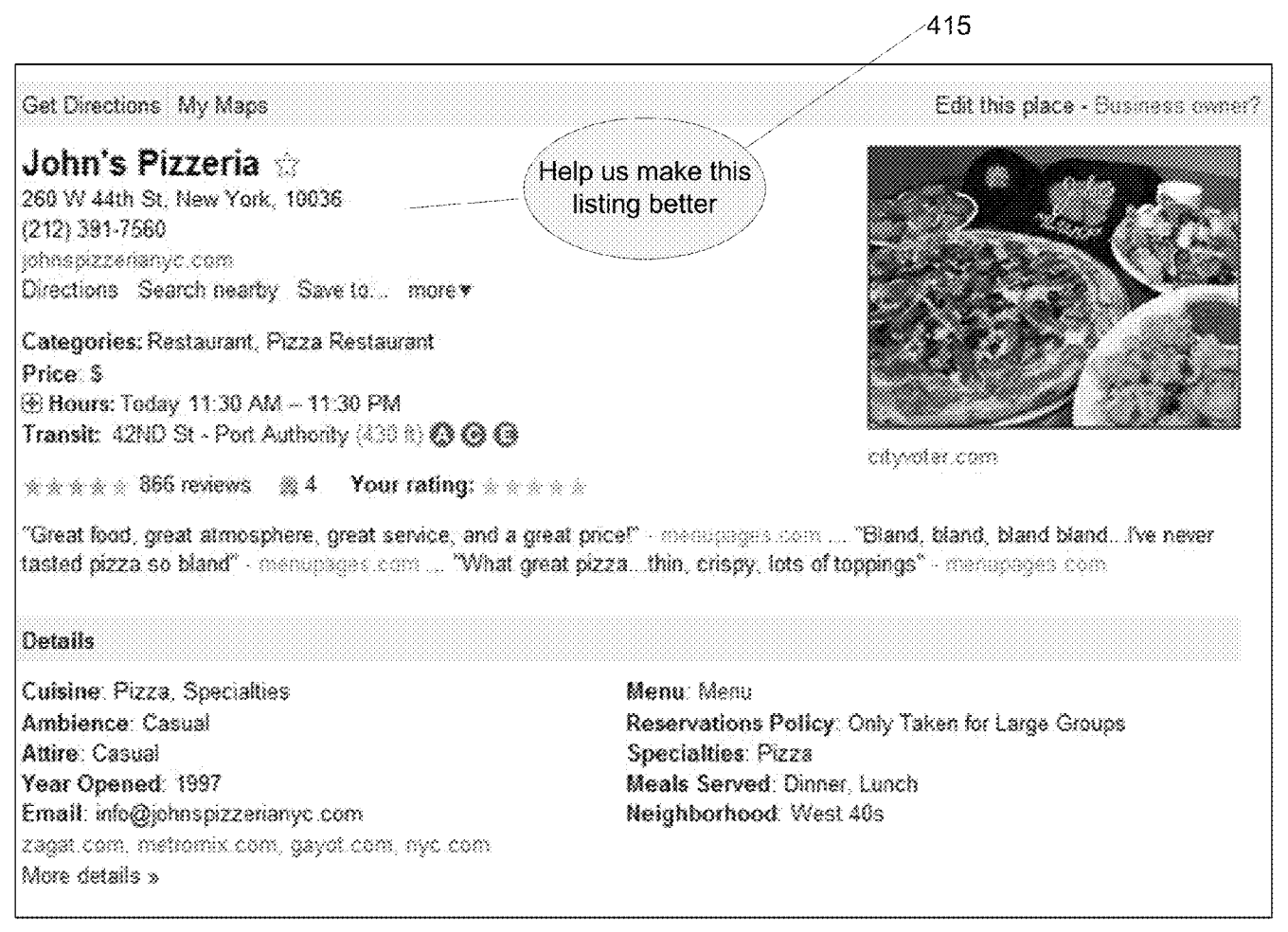

The search engine 113 provides 345 the map features and one or more questions to the client device 115. FIGS. 4 and 5 are screenshots of example displays to users. FIG. 4 shows search results provided to a user in response to a search query for pizza in New York City. The search results are displayed on the map 405 with details of the search results displayed in a panel 410 to the side of the map. For the first search result, a question has been returned to the user along with the search results. This is displayed to the user as a balloon 415 on which the user can click to reveal the question and provide feedback. The "more info" link 420 allows a user to click through to a page with detailed information about that search result. FIG. 5 is a screenshot of the page for John's Pizzeria, obtained by clicking through the link 420. The question balloon 415 can also be displayed to the user here on the detailed information page. In one embodiment, the user profile indicates that the user has selected to provide feedback for map features from the detailed information page rather than from a results list page. In such an embodiment, the question balloon 415 would not appear on the search result list page such as FIG. 4 and only appear if the user clicks through to the detailed information page.

Figure 6:
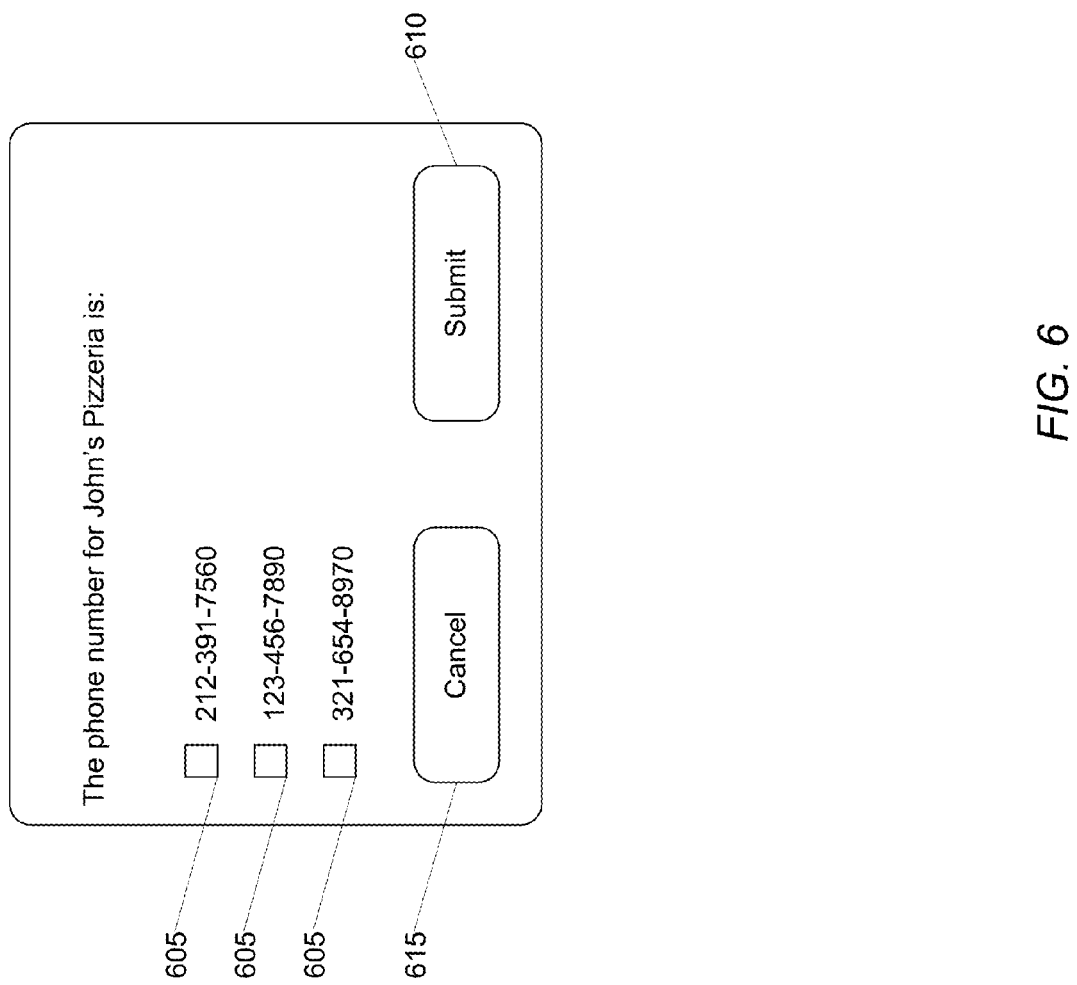
FIG. 6 is a screenshot illustrating a question about an attribute of a map feature being presented to a user according to one embodiment.

Upon clicking through the question balloon 415, a dialog box with the question is displayed to the user. FIG. 6 is a screenshot illustrating such a dialog box. This question is in multiple choice format. The user is provided buttons 605 to select what the user believes to be the correct phone number. Optionally, the user is asked where the user learned the answer they are providing. For example, a user may have obtained the correct phone number for John's Pizzeria from the restaurant's webpage. The user would then enter that URL. Alternatively, the user may answer that they have the number memorized. After selecting an answer, the user clicks on the submit button 610 to transmit the answer back to the geographic information server 100. Alternatively, the user can choose not to answer and click cancel 615 instead.

Returning to FIG. 3, the user's response is received 350 at the client device 115 and provided 355 to the feedback engine 103. The feedback engine 103 updates 365 the user profile database 109 to indicate that the user has answered this question. The feedback engine 103 also updates 370 the question database 111 with the answer given by the user as well as increasing the count to keep track of the number of times that the question has been answered.

After a threshold number of answers have been received for a given question related to a map feature, the answers are reviewed and a consensus answer determined. In one embodiment, the consensus answer is the one receiving a majority of votes from the threshold number of answers. Using the example in FIG. 6, if more than half of users chose 212-391-7560 as the phone number for John's Pizzeria, 212-391-7560 becomes the consensus answer.

Alternatively, each answer has a score that is the weighted count of votes received for that answer, where each vote is weighted with the reliability score of the user providing the vote. Table 2 displays data collected for the example in FIG. 6 along with user reliability scores:

TABLE 2

| Answer | User's Reliability Score |
| --- | --- |
| 212-391-7560 | 0.85 |
| 212-391-7560 | 0.90 |
| 212-391-7560 | 0.33 |
| 321-654-8970 | 0.22 |
| 321-654-8970 | 0.18 |
| 321-654-8970 | 0.17 |
| 321-654-8970 | 0.55 |
| 321-654-8970 | 0.42 |

In this example, there either is no threshold reliability for users answering questions or it is set very low. Phone number 212-391-7560 got fewer votes but from users with higher reliability scores, and has an average weight of 0.69. The high number of votes for phone number 321-654-8970, with a low average weight of 0.31, could be a deliberate attempt to spam the system or just well-meaning users who are not familiar with pizzerias in New York. Regardless, the use of reliability scores to weight the votes for the phone number results in the phone number with the highest weight, in this case the correct phone number 212-391-7560, being the consensus answer.

The determination of a consensus answer may be done automatically or manually. The record for the map feature is updated with that answer in the geographic information database 107. Additionally, the reliability score for users answering that question is updated with whether the user's answer was the consensus answer.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method for soliciting feedback for an attribute of a map feature comprising:
   identifying a map feature to be displayed on a map to a user wherein the map feature has a category describing a type of the map feature, a geographic region describing a location of the map feature and a map feature attribute with an associated confidence score indicating a low confidence that a value of the map feature attribute is accurate;
   determining a question to solicit information about the value of the map feature attribute from the user responsive to the confidence score indicating the low confidence that the value of the map feature attribute is accurate;
   retrieving a plurality of reliability scores for the user, the plurality of reliability scores based at least in part on how often feedback from the user in response to questions previously submitted to the user matched consensus values determined for map feature attribute values from a plurality of users and including one or more category-specific reliability scores based on feedback provided by the user in response to questions previously submitted to the user about specific categories of map features, one or more region-specific reliability scores based on feedback provided by the user in response to questions previously submitted to the user about map features located in specific geographic regions, and a global reliability score based on feedback provided by the user in response to all questions previously submitted to the user;
   scoring the question based at least in part on a popularity score for the map feature, a priority score for the map feature attribute, the confidence score for the value of the map feature attribute, and at least one retrieved reliability score for the user; and
   submitting the question to the user if the score for the question is greater than a threshold.

2. The method of claim 1 further comprising receiving, from the user, a response to the question indicating a user-specified value for the map feature attribute.

3. The method of claim 2, further comprising updating the reliability score of the user based at least in part on the response to the question.

4. The method of claim 2, further comprising updating the map feature attribute value in a map repository based at least in part on the received response.

5. The method of claim 2, further comprising determining a consensus value for the map feature attribute based on the response received from the user and a plurality of responses received from a respective plurality of other users.

6. The method of claim 5, wherein the consensus value is determined by weighting the responses received from the user and the plurality of other users by the respective reliability scores associated with the user and the plurality of other users.

7. The method of claim 5, further comprising determining a confidence score for the consensus value of the map feature attribute.

8. The method of claim 1, further comprising using the score for the question to rank the question among a plurality of questions relating to a respective plurality of map feature attributes; and wherein submitting the question to a user further comprises determining that the question ranks higher than a threshold number of questions to be sent to the user.

9. A system including one or memories storing instructions and one or more processors, coupled to the memories and executing the instructions stored therein in order to perform steps comprising:
   identifying a map feature to be displayed on a map to a user wherein the map feature has a category describing a type of the map feature, a geographic region describing a location of the map feature and a map feature attribute with an associated confidence score indicating a low confidence that a value of the map feature attribute is accurate;
   determining a question to solicit information about the value of the map feature attribute from the user responsive to the confidence score indicating the low confidence that the value of the map feature is accurate;
   retrieving a plurality of reliability scores for the user, the plurality of reliability scores based at least in part on how often feedback from the user in response to questions previously submitted to the user matched consensus values determined for map feature attribute values from a plurality of users and including one or more category-specific reliability scores based on feedback provided by the user in response to questions previously submitted to the user about specific categories of map features, one or more region-specific reliability scores based on feedback provided by the user in response to questions previously submitted to the user about map features located in specific geographic regions, and a global reliability score based on feedback provided by the user in response to all questions previously submitted to the user;
   scoring the question based at least in part on a popularity score for the map feature, a priority score for the map feature attribute, the confidence score for the value of the map feature attribute, and at least one retrieved reliability score for the user; and
   submitting the question to the user if the score for the question is greater than a threshold.

10. The system of claim 9 wherein the system further receives, from the user, a response to the question indicating a user-specified value for the map feature attribute.

11. The system of claim 10, wherein the system further updates the reliability score of the user based at least in part on the response to the question.

12. The system of claim 10, wherein the system further updates the map feature attribute value in a map repository based at least in part on the received response.

13. The system of claim 10, wherein the system further determines a consensus value for the map feature attribute based on the response received from the user and a plurality of responses received from a respective plurality of other users.

14. The method of claim 1, wherein determining a question to solicit information about the value of the map feature attribute from a user comprises selecting the question from a predetermined list of questions.

15. The method of claim 1, wherein the map feature is an entity associated with a geographic location.

16. The method of claim 1, wherein the map feature attribute is one of a street address, a phone number, a fax number, a website address, or an email address.

* * * * *